United States Patent Office 2,991,170

Patented July 4, 1961

2,991,170

PROCESS FOR THE MANUFACTURE OF FERTILIZERS CONTAINING WATER-SOLUBLE NITROGEN COMPOUNDS

Karoly Szepesi, Ferenczi Istvan utca 14, and Tibor Jancso, Veres Palne utca 19, both of Budapest, Hungary, and Jozsef Varga, deceased, late of Dezso utca 12/a, Budapest, Hungary, by Etel Varga and Tibor Varga, heirs, both of Budapest, Hungary No Drawing. Filed Dec. 3, 1957, Ser. No. 700,296
2 Claims. (Cl. 71—61)

This invention relates to new fertilizer compositions of a nitrogen content and to the preparation of such fertilizers.

It is an object of the present invention to provide a new, water soluble nitrogen compound containing fertilizer with a high water retention capacity.

Another object of the present invention is to provide a water soluble nitrogen compound containing fertilizer in which the said nitrogen compound can withstand to a high degree to the leaching effect of water when applied to the soil as a fertilizer.

A further object is to provide the water soluble nitrogen compound containing fertilizer in an aqueous suspension or slurry which may be pumped and spread out onto the soil and in which the solid particles of said slurry possess a high water retention capacity, and which is further more capable of retaining the water soluble nitrogen compound.

A still further object of the present invention is to provide a process for producing an ammonium nitrate containing fertilizer with a high water and ammonium nitrate retention capacity in a slurry as well as in a solid granular form.

Other objects of the invention include the manufacture of water soluble nitrogen compound containing fertilizers which are especially apt to be used on sandy soils or other loose structure soils, e.g. waste lands in order to increase the efficiency of the water soluble nitrogen compounds used and with the further aim of improving such soils.

It has already been suggested to improve the stability and to ensure ready spreading of ammonium nitrate by adding to it kaolin, clay, feldspar, leucite or phonolite. These materials have been proposed for the substitution of calcium carbonate, and were aimed at improving the easy spreading of ammonium nitrate. The materials referred to above contain aluminium silicates and possess, to a varying degree, the capacity of base-exchange. Contrary to calcium carbonate, these materials do not liberate ammonia from the ammonium nitrate, a fact which is of advantage as compared with calcium carbonate. Their water-retention capacity is, however, limited, so that water soluble ammonium salts are easily leached, for example in sandy soil, whereby the plants cultivated cannot utilize them. The basic minerals of the aluminium silicates referred to above, such as kaolinite for kaolin, have double-layer crystal lattices.

In the course of our experiments it has been ascertained that minerals containing montmorillonite, such as bentonite—that is, aluminium hydrosilicates are greatly different from the aluminium silicates referred to above, from the point of view of the ability of water retention and of cation exchange and of the retention of water soluble fertilizer salts, in particular of ammonium nitrate. A similar difference has been observed in connection with with vermiculite, glauconite and, to a lesser degree, illite minerals, which are potassium aluminium hydrosilicates. Between the aluminium hydrosilicates suggested by us in view of the above disclosed advantages on the one hand, and between the previously suggested aluminium hydrosilicates (e.g. kaolin) and potassium aluminium silicates (e.g. feldspars), on the other, the difference resides in their crystalline structure. Thus, feldspar leucite, or phonolite cannot be decomposed by mineral acids, neither do they possess the capacity of cation-exchange. It is true that kaolin can be decomposed by mineral acids, but its capacity of cation-exchange is very low about 5–15 milliequivalent and it has a double-layer crystalline lattice. Minerals containing montmorillonite, such as bentonite, further glauconite, vermiculite and illite, on the other hand, may be decomposed by mineral acids and have a three-layer crystalline lattice. The cation-exchange capacity of montmorillonite is 120 to 150 milliequivalents, that of glauconite 130 to 170, of vermiculite 130 to 170 and of illite 35 to 45, respectively. This accounts for the fact that these latter materials are able to take in their crystalline lattice a larger amount of water, and of salts dissolved therein, bound to a certain degree in the said crystalline lattice. In consequence thereof, these minerals, if admixed to water soluble fertilizer salts, have a special effect. By spreading the fertilizers containing said minerals on sandy soils or on other soils of loose structure, the leaching of the water soluble fertilizer salts can be reduced, whereby the efficiency of the fertilizer is increased. The use of the fertilizer according to the invention also improves the structure and water economy of loose soils, and it is even possible to convert dead soils and hitherto arid sandy or gravel soils and waste lands into productive areas.

The process according to the invention for producing fertilizers containing water soluble nitrogen compounds comprises, therefore, in admixing to these water soluble nitrogen compounds, in particular to ammonium nitrate, ammonium sulfate, and to urea, aluminium hydrosilicates or potassium aluminium hydrosilicates of a three-layer crystalline structure, possessing a cation-exchange capacity of at least 35 milliequivalents, and apt to be decomposed by mineral acids. As fillers of such effect it is suggested according to the invention to use minerals containing montmorillonite, in particular bentonite. Besides bentonite, the desired effect can be attained by using vermiculite, glauconite or illite which minerals contain potassium, or materials or mixtures consisting mainly of the said minerals.

The amount of the filler referred to above having a three-layer crystalline structure is to be more than 40 percent, preferably 50 to 80 percent, calculated on the nitrogen compound.

In one preferable embodiment of the invention the aluminium hydrosilicate or potassium aluminium hydrosilicate fillers are admixed to the water soluble nitrogen containing compound in an aqueous suspension. Preferably one should proceed in the following manner: An aqueous suspension of the aluminium hydrosilicate filler is contacted with gases containing nitrogen oxides to adsorb the same, and then the nitric acid solution so obtained containing the suspension of partly digested aluminium hydrosilicate is neutralized with ammonia. The aqueous suspension so obtained containing ammonium nitrate can be directly used as a fertilizer but it is preferable to expel the water by heating from the said suspension neutralized with ammonia, and to granulate the solid residue of the procedure. The granulated fertilizer thus obtained involves hardly any dust loss, has a low hygroscopicity and a very low decomposition factor. In consequence, packing of the fertilizer according to the invention requires less care, or it may even be transported in bulk.

According to another embodiment of the invention one can dissolve ammonia in the aqueous suspension of the proposed aluminum hydrosilicate filler, or the filler may be mixed with an aqueous solution of ammonium hydroxide, and the slurry so obtained can be used as a fertilizer. The ammonia contained in the slurry has a reduced tension owing to the presence of the filler. When the main task is improvement of the water retention capacity of loose, sandy or gravel soils or waste lands, that is, the conversion of these soils into fertile lands, one uses:

An ammonium bentonite containing an ammonium radical in an amount merely corresponding to the cation exchange capacity of the same. For example 5 parts of weight of $NH_4NO_3$ is added in an aqueous solution to 100 parts of weight of bentonite; the mixture is homogenized in a suitable mixer-kneader apparatus, thereafter dried and granulated.

The ingredients suggested above may be mixed also with other nitrogen salts, such as ammonium sulfate, and urea. One can mix the urea with freshly mined bentonite, or with glauconite or illite, and employ it as a slurry, or it may be dried and granulated in the usual manner.

Different montmorillonites show considerable differences as to their morphological structure and their gel structure, and are therefore not equally adapted to be used according to the invention. The same refers to bentonites due to their montmorillonite content. The swelling-power and other rheological properties of alkaline earth bentonites may be improved by their partial conversion into alkali bentonites, particularly into potassium bentonites. This treatment can be carried out by reacting alkaline earth bentonites with alkali metal salts at elevated temperatures of at least 40° centigrade, preferably between 80° and 90° centigrade. In this operation the water content of the treated bentonite should not exceed 50 percent, and should preferably be in the range of 30° to 40° centigrade, which is economical and sufficient for completing the reaction. Treating a freshly mined bentonite of an adequate humidity the alkali salts may be added in the form of a concentrated solution or even in crystalline form. The preferable amount of alkali metal salts is in general about 1 to 8 percent calculated on the dry bentonite. As alkali metal salts we use preferably potassium salts, e.g. potassium sulfate, potassium chloride, potassium phosphate, owing to their fertilizing capacity.

The following examples are preferable embodiments of the invention.

EXAMPLE 1

Freshly mined calcium bentonite containing 60 percent montmorillonite are suspended in water in an amount to yield a slurry with a bentonite content of 15 percent. This suspension is pumped into an absorbing apparatus known in the art, comprising several columns connected in series and a gas stream containing nitrogen oxides is introduced in counter current to the slurry. The suspension is discharged by the adsorbing apparatus containing about 50 percent nitric acid, is neutralized with ammonia gas in a Hobler-column known in the ammonium nitrate production, then the solution so obtained containing ammonium nitrate is concentrated in vacuum, and thereafter dried and granulated in a manner known for the production of calcium ammonium nitrate. In this manner a bentonite fertilizer of a preferably 20.5 percent nitrogen content is obtained. For properly drying the fertilizer, it is advisable to use infra-red radiation.

In the course of the adsorption of the nitrogen oxides, the montmorillonite is digested to a certain extent by the nitric acid thus formed, whereby its cation exchange capacity is increased. The fertilizer obtained in this manner contains an intimate mixture of filler and ammonium nitrate. In the event of employing potassium containing hydrosilicates, part of the potassium is converted upon the above described treatment into water-soluble potassium nitrate, which is apt for being directly utilized by the plant.

EXAMPLE 2

The fertilizer according to Example 1 may also be produced in the following manner: bentonite, glauconite, illite or vermiculite is mixed with a fused ammonium nitrate and treated in a manner known in the art for the mining of fused ammonium nitrate with other solid fillers. Thereby fertilizers are produced, having a water retention capacity considerably higher then in admixture with kaolin, phonolite, feldspar and similar minerals, possessing double layer crystalline lattices.

The water and salt retention capacity of the fertilizer may be increased by employing the bentonite in an amount over 50 percent, preferably over 75 percent, in the ammonium nitrate and the bentonite mixture.

In the following comparative tests relatively pure minerals have been used, and in each case a fertilizer mixture containing 55 percent ammonium nitrate has been employed. These fertilizers have been admixed in a 5 percent amount to calcined, clay-free sand. Samples of the sand have been subjected to leaching tests at identical conditions. The amount of the leaching water has been so selected that the total amount of water should correspond to approximately 50 mm. precipitation, calculated on the surface of the samples, and the leaching has been so timed that each wash should correspond to a large amount of a suddenly fallen precipitation. The amount of water equalling a 50 m. precipitation has been added in three portions during 80 minutes, after the test material had been previously watered with 30 or 36 ml. water. For the purpose of the comparative tests the following minerals have been used: Swedish feldspar (consisting essentially of pure orthoclase), washed Zettlitz kaolin of a 96 percent kaolinite content, calcium-bentonite of a 75 percent montmorillonite content, and glauconite containing 80 percent glauconite. The effect of leaching is illustrated in the table given below.

The leaching tests were in each case carried out in a glass funnel of an 80 mm. upper diameter. The mixture of 100 g. washed sand and 5 g. fertilizer preparation were placed on folding filter paper, and the distilled water used for the leaching process was uniformly allowed to drop on the samples from above until the samples were thoroughly wetted (the amount of water required therefor was 30.5 ml. for Swedish feldspar and for Zettlitz kaolin, 34 ml. for calcium ammonium nitrate, 36 ml. for bentonite or glauconite) and continued until the first drop was observed at the lower end of the funnel. Then the 3 portions of leaching water of 50 ml. each were added in drops, and the time of discharge of the filtrates and their total nitrogen content were determined with the Dewarde process.

To complete the tests, ammonium nitrate fertilizer containing calcium carbonate was also tested.

*Table*

| | Swedish feldspar | Zettlitz kaolin | Ca-bentonite | Glauconite | $CaCO_3$ |
|---|---|---|---|---|---|
| | containing 55% $NH_4NO_3$ | | | | |
| First leaching (20 ml. precipitation) time of discharge. | 10 minutes | 10 minutes | 25 minutes | 20 minutes | 11 minutes. |
| Amount of $NH_4NO_3$ leached. | 98.1% (2.697 g.) | 94.3% (2.593 g.) | 78% (22.145 g.) | 81% (2.227 g.) | 91.5% (2.516 g.). |
| Second and third leaching (30 m./m. precipitation), time of discharge. | 20 minutes | 30 minutes | 2 hours | 1 hour 40 minutes | 20 minutes. |
| Amount of $NH_4NO_3$ leached. | 100% (2.75 g.) | 100% (2.75 g.) | 80% (2.20 g.) | 84% (2.31 g.) | 99.5% (2.74 g.). |

The above results show that the water-retention capacities of bentonite and glauconite are much higher then for feldspar, kaolin or calcium carbonate. A 50 mm. precipitation usually passes in 30 minutes the sand containing feldspar, kaolin and calcium carbonate additives, and already the first water charge corresponding to a 20 mm. precipitation leaches most of the ammonium nitrate, while a water charge corresponding to a 50 mm. precipitation leaches it entirely. Fertilizer mixtures containing bentonite and glauconite, on the other hand, retain the water so that an amount of water corresponding to the same amount of precipitation will pass during 1½ to 2 hours, and about 20 percent of the ammonium nitrate is retained.

The leaching tests show further that the discharge time for the first installment of leaching water is 2 to 2.5 times longer for the bentonite and glauconite than for the feldspar, kaolin and $CaCo_3$-containing samples. The total discharge time is 4 to 6 times longer for bentonite containing fertilizers and 3.3 to 5 times longer for glauconite containing fertilizers than for samples of other fertilizers with fillers not containing aluminium hydrosilicates possessing a three layer crystal lattice. These figures convincingly prove that fertilizers containing bentonite and other admixtures according to the invention considerably improve the water economy of sandy soils.

If the tests are accomplished with a fertilizer containing only 25 percent fertilizer (instead of 55 percent) and 75 percent filler, the results are still more striking.

EXAMPLE 3

Ammonium bentonite primarily intended for the improvement of loose soils can be produced in the following manner: 5 parts ammonium nitrate is added to 100 parts calcium bentonite possessing 30 percent humidity at temperatures over 20° centigrade, preferably of 50° to 60° centigrade, the mixture is stirred in an Eirich kneader until it is homogeneous, then dried and granulated. From the ammonium-bentonite so prepared, the $NH_4$-radical cannot be leached with water, that can only be dissolved and utilized by plants. The water retention capacity of the bentonite is also improved by the $NH_4$-radical bound.

EXAMPLE 4

A highly efficient fertilizer can be obtained in the following manner: 55 parts urea are added to 45 parts calcium bentonite, with a humidity 30 percent of thoroughly mixed, dried and thereafter processed in the manner known in the art for the production of calcium ammonium nitrate.

The fertilizer thus produced has been subjected to a leaching experiment as described in connection with Example 2.

EXAMPLE 5

100 parts of alkaline earth bentonite with a montmorillonite content of about 60% and a 35% humidity is mixed and kneaded for about 10 minutes with 4 parts of potassium hydrophosphate, while introducing steam, by which the temperature is brought to 80 to 90 centigrades. In this manner the water retention and cation exchange capacity of the said bentonite is considerably improved. The bentonite thus obtained is then treated according to the process described in Examples 1 and 2 resulting a fertilizer with improved water and salt retention capacity.

What we claim is:

1. Process for the manufacture of nitrogen-containing fertilizers which comprises absorbing nitrogen oxide gases with an aqueous suspension of hydrosilicate selected from the group consisting of montmorillonite, bentonite, vericulite, glauconite and illite, and neutralizing the acid slurry so obtained with ammonia.

2. Process for the manufacture of nitrogen-containing fertilizers as set forth in claim 1, in which the water is driven off from the neutralized slurry, and the solid residue thus obtained is granulated.

References Cited in the file of this patent

UNITED STATES PATENTS

| | | |
|---|---|---|
| 2,314,091 | Jones | Nov. 16, 1943 |
| 2,410,436 | Ewing | Nov. 5, 1946 |
| 2,531,396 | Carter et al. | Nov. 28, 1950 |
| 2,669,510 | Dresser | Feb. 16, 1954 |
| 2,765,290 | Ziegler | Oct. 2, 1956 |
| 2,791,496 | Rice | May 7, 1957 |

OTHER REFERENCES

Bentonite—Its Properties, Mining, Preparation and Utilization, by C. W. Davis et al., Bureau of Mines Publication, U.S.G.P.O., Washington, 1928, pages 49 and 50.

Kunin et al.: "Ion Exchange Resins," 1950, pages 1 and 2.